US005729418A

United States Patent [19]
Lei

[11] Patent Number: 5,729,418
[45] Date of Patent: Mar. 17, 1998

[54] HIGH VOLTAGE CURRENT LIMITING PROTECTION CIRCUIT AND METHOD THEREFOR

[75] Inventor: Jimes Lei, Milpitas, Calif.

[73] Assignee: Supertex, Inc., Sunnyvale, Calif.

[21] Appl. No.: 705,139

[22] Filed: Aug. 29, 1996

[51] Int. Cl.$^6$ ............................................. H02H 9/00
[52] U.S. Cl. .................................... 361/58; 361/91
[58] Field of Search ............................ 361/58, 111, 86, 361/88, 91

[56] References Cited

U.S. PATENT DOCUMENTS

| | | | |
|---|---|---|---|
| 4,533,970 | 8/1985 | Brown | 361/58 |
| 4,811,156 | 3/1989 | Kroll | 361/58 |

Primary Examiner—Jeffrey A. Gaffin
Assistant Examiner—Michael J. Sherry
Attorney, Agent, or Firm—Harry M. Weiss; Jeffrey D. Moy; Harry M. Weiss & Associates, P.C.

[57] ABSTRACT

A high voltage current limiting protection circuit for measurement equipment and measurement probes. The circuit is comprised of a plurality of elements one of which is variable resistance means which are coupled between a first terminal and a second terminal of the circuit for generating a low resistance level to allow a fast response by the measurement equipment to measure current flowing between the two terminals. The variable resistance means generates a high resistance level to limit current flow to a minimum level between the two terminals when a predetermined maximum voltage level across the two terminals is exceeded. Voltage trip point means are coupled to the variable resistance means for setting the predetermined maximum voltage level to trigger the variable resistance means to generate the high resistance level to limit current flow between the two terminals to the minimum level.

22 Claims, 2 Drawing Sheets 5,729,418

HIGH VOLTAGE CURRENT LIMITING PROTECTION CIRCUIT AND METHOD THEREFOR

BACKGROUND OF THE INVENTION

1. Field of the Invention

This invention relates to protection circuitry and, more specifically, to a high voltage current limiting protection circuit which may be used to protect measurement equipment from being damaged when the measurement probe is inadvertently coupled to a high voltage source.

2. Description of the Prior Art

Instrumentation equipment such as data acquisition systems are equipped with measurement probes that are used to measure or sample low voltages and currents. Quite often, operators of the instrumentation equipment will inadvertently connect the measurement probes to a high voltage source such as an AC utility line. Without protection, considerable damage will occur to the measurement probes and to the measurement electronics. For this reason, circuit designers have often implemented a means for protecting the measurement probes and the measurement electronics. Common protection schemes include the use of current limiting resistors in series with the measurement probes as shown in FIG. 1, or fuses in series with the measurement probes as shown in FIG. 2.

The use of current limiting resistors will provide some degree of protection but with the penalty of degraded measurement response time or bandwidth. The larger the resistor value, the higher the amount of voltage the resistor may protect against. However, a current limiting resistor that is too large will slow down the response time of the measurement system. If a smaller value current limiting resistor is used, the resistance level may be inadequate to protect against 120 VAC or 240 VAC power lines. Furthermore, if the measurement probes are connected to a high voltage line for a long period of time, the power dissipation rating of the current limiting resistor would also need to be increased in order to prevent the resistor from being damaged.

As stated above, fuses have also been used to protect the measurement probes and the measurement electronics from damage due to high voltage and current levels. While fuses will cause negligible bandwidth degradation, fuses may respond too slowly to protect the measurement electronics. The use of fuses require that the measurement probes and the measurement electronics be robust enough to absorb the amount of energy from the high voltage source before the fuses are blown open. Furthermore, the use of fuses require the user to replace the fuses each time the voltage level rating of the fuses is exceeded and the fuses are blown.

Therefore, a need existed to provide an improved high voltage current limiting protection circuit for use with measurement probes and measurement electronics. The improved protection circuit must be coupled in series with the measurement probe and have a low impedance level such that the protection circuit will cause negligible bandwidth degradation. The improved protection circuit must also be fast enough to generate a high impedance level to protect the measurement probes and measurement electronics from damage due to excessive voltage and current levels.

SUMMARY OF THE INVENTION

In accordance with one embodiment of the present invention, it is an object of the present invention to provide an improved high voltage current limiting protection circuit for use with measurement probes and measurement electronics.

It is another object of the present invention to provide an improved high voltage current limiting protection circuit for use with measurement probes and measurement electronics that is coupled in series with the measurement probe and that has a low impedance level such that the protection circuit will cause negligible bandwidth degradation.

It is still another object of the present invention to provide an improved high voltage current limiting protection circuit for use with measurement probes and measurement electronics that provides bi-directional protection against both positive and negative high voltage levels.

It is still another object of the present invention to provide an improved high voltage current limiting protection circuit for use with measurement probes and measurement electronics that is fast enough to generate a high impedance level to protect the measurement probes and measurement electronics from damage due to excessive voltage and current levels.

It is still a further object of the present invention to provide an improved high voltage current limiting protection circuit for use with measurement probes and measurement electronics that is fast enough to generate a high impedance with a minimal heat dissipation level to protect the measurement probes and measurement electronics from damage due to excessive voltage and current levels.

BRIEF DESCRIPTION OF THE PREFERRED EMBODIMENTS

In accordance with one embodiment of the present invention, a high voltage current limiting protection circuit for measurement equipment and measurement probes is disclosed. The protection circuit is comprised of a plurality of elements one of which is variable resistance means. The variable resistance means are coupled between a first terminal and a second terminal of the protection circuit for generating a low resistance to allow a fast response by the measurement equipment to measure current flowing between the first terminal and the second terminal of the protection circuit. The variable resistance means is further used for generating a high resistance level to limit the current flow to a minimum level between the first terminal and the second terminal of the protection circuit when a predetermined maximum voltage level across the first terminal and the second terminal of the protection circuit is exceeded. Voltage trip point means are coupled to the variable resistance means for setting the predetermined maximum voltage level to trigger the variable resistance means to generate the high resistance level to limit the current flow between the first terminal and the second terminal of the protection circuit to the minimum level. The variable resistance means is comprised of transistor means for generating negligible resistance between the first terminal and the second terminal of the protection circuit when the voltage across the first terminal and the second terminal is below the predetermined maximum voltage level. The transistor means are further used for generating a high resistance to limit the current flow between the first terminal and the second terminal to the minimum level when the predetermined maximum voltage level across the first terminal and the second terminal is exceeded. The variable resistance means is further comprised of switch means coupled to the transistor means for generating negligible resistance between the first terminal and the second terminal of the protection circuit when voltage across the first terminal and the second terminal is below the predetermined maximum voltage level and which is further used for switching the transistor means to a high resistance mode to generate a high resistance level to limit the current flow between the first terminal and the second terminal to the minimum level when the predetermined maximum voltage level across the first terminal and the second terminal of the protection circuit is exceeded. The protection circuit may further comprises voltage protection means coupled to the switch means for protecting the switch means from damage due to voltage levels in excess of a voltage level rating of the switch means.

In accordance with another embodiment of the present invention, a method for providing a high voltage current limiting protection circuit for measurement equipment and measurement probes is disclosed. The method comprises the steps of: providing variable resistance means coupled between a first terminal and a second terminal of the protection circuit for generating low resistance to allow a fast response by the measurement equipment to measure current flowing between the first terminal and the second terminal of the protection circuit and which is further used for generating a high resistance to limit current flow to a minimum level between the first terminal and the second terminal of the protection circuit when a predetermined maximum voltage level across the first terminal and the second terminal is exceeded; and providing voltage trip point means coupled to the variable resistance means for setting the predetermined maximum voltage level to trigger the variable resistance means to generate the high resistance to limit current flow between the first terminal and the second terminal of the protection circuit to the minimum level. The step of providing variable resistance means may further comprise the steps of: providing transistor means for generating negligible resistance between the first terminal and the second terminal of the protection circuit when voltage across the first terminal and the second terminal is below the predetermined maximum voltage level and for generating a high resistance to limit the current flow between the first terminal and the second terminal of the protection circuit to the minimum level when the predetermined maximum voltage level across the first terminal and the second terminal is exceeded; and providing switch means coupled to the transistor means for generating negligible resistance between the first terminal and the second terminal of the protection circuit when voltage across the first terminal and the second terminal of the protection circuit is below the predetermined maximum voltage level and for switching the transistor means to a high resistance mode to generate a high resistance to limit current flow between the first terminal and the second terminal of the protection circuit to the minimum level when the predetermined maximum voltage level across the first terminal and the second terminal is exceeded. The method may further comprise the step of providing voltage protection means coupled to the switch means for protecting the switch means from damage due to voltage levels in excess of a voltage level rating of the switch means.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENT

Figure 1:
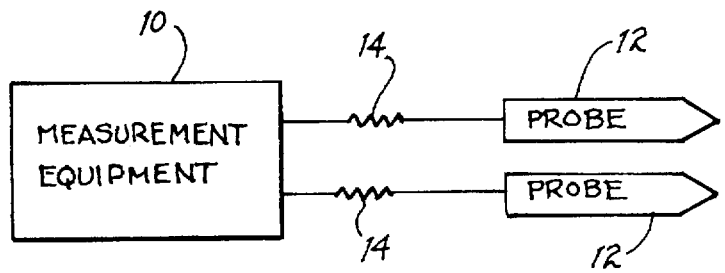
FIG. 1 is a simplified electrical schematic of a prior art high voltage protection circuit for measurement probes and measurement electronics.
Figure 2:
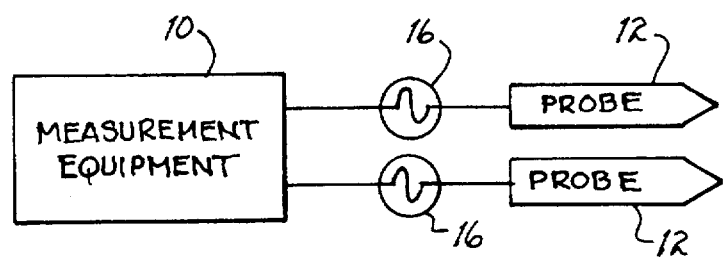
FIG. 2 is a simplified electrical schematic of a second prior art high voltage protection circuit for measurement probes and measurement electronics.

Referring to FIGS. 1 and 2, two embodiments of prior art protection circuits for protecting measurement probes and measurement electronics are shown. In FIG. 1, a current limiting resistor 14 is placed in series between the measurement equipment 10 and the measurement probe 12. As stated above, the use of a large current limiting resistor 14 will provide some degree of protection but with the penalty of degraded measurement response time or bandwidth. However, a smaller value current limiting resistor 14 may be inadequate to protect against 120 VAC or 240 VAC power lines.

Referring to FIG. 2 wherein like numerals and symbols represent like elements, a second prior art protection circuit is shown. In this embodiment, a fuse 16 has been used to protect the measurement probes 12 and the measurement equipment 10 from damage due to high voltage and current levels. While fuses 16 will cause negligible bandwidth degradation, fuses may respond too slowly to protect the measurement equipment 10 from damage. As stated above, the use of fuses 16 require that the measurement probes 12 and the measurement equipment 10 be robust enough to absorb the amount of energy from the high voltage source before the fuses 16 are blown open. Furthermore, the use of fuses 16 require the user to replace the fuses 16 each time a voltage level rating of the fuse 16 is exceeded and the fuses 16 are blown open.

Figure 3:
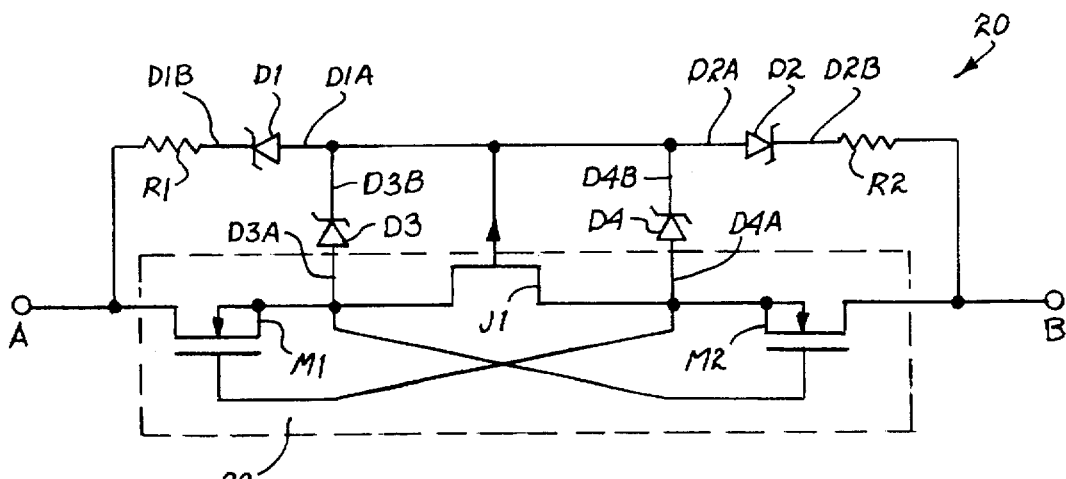
FIG. 3 is a simplified electrical schematic of the high voltage current limiting circuit of the present invention.

Referring to FIG. 3, a high voltage current limiting protection circuit 20 (hereinafter circuit 20) is shown. The circuit 20 is used for protecting measurement equipment and measurement probes from damage due to excessive voltage and current levels. The circuit 20 is comprised of a resistive element 22 across the terminals A and B of the circuit 20. The resistive element 22 has a low resistance level to allow a fast response by the measurement equipment to measure current flowing between the terminals A and B. The resistive element 22 also generates a high resistance level to limit current flow to a minimum level between the terminals A and B when a predetermined maximum voltage level across the terminals A and B is exceeded.

The resistive element is comprised of two transistors M1 and M2 and a device J1. In the preferred embodiment of the present invention, the transistors M1 and M2 are high voltage, depletion mode N-channel MOSFETs and the device J1 is a low voltage depletion mode P-channel transistor which may be either a JFET or a MOSFET. The resistance value of the resistive element 22 is determined by the sum of the channel resistance of M1, M2, and J1. In the preferred embodiment of the present invention, the resistance value is approximately 1.0k ohm with the transistors M1 and M2 having the same resistance value across their respective channels.

A pair of zener diodes D1 and D2 are provided to set up a voltage trip point to trigger the resistive element 22 to generate a high resistance level to limit current flow between the terminals A and B to a minimum level. Both zener diodes D1 and D2 have a pair of terminals, D1A and D1B for zener diode D1, and D2A and D2B for zener diode D2. The terminals D1A and D2A are both coupled to a gate of the device J1.

A resistor R1 is coupled to the terminal D1B of the zener diode D1. Similarly, a resistor R2 is coupled to the terminal D2B of the zener diode D2. The resistors R1 and R2 are high value resistors which are used to limit the amount of bias current for the zener diodes D1 and D2. In the preferred embodiment of the present invention, the resistors R1 and R2 have a value of approximately 1.0M ohms.

A second pair of zener diodes D3 and D4 are provided to protect the gate of the device J1. Both zener diodes D3 and D4 have a pair of terminals, D3A and D3B for zener diode D3, and D4A and D4B for zener diode D4. The zener diode D3 is coupled to the resistive element 22 such that terminal D3A is coupled to a gate of transistor M2, and the terminal D3B is coupled to the gate of the device J1. The zener diode D4 is coupled to the resistive element 22 such that terminal D4A is coupled to a gate of transistor M1, and the terminal D4B is coupled to the gate of device J1.

Figure 4:
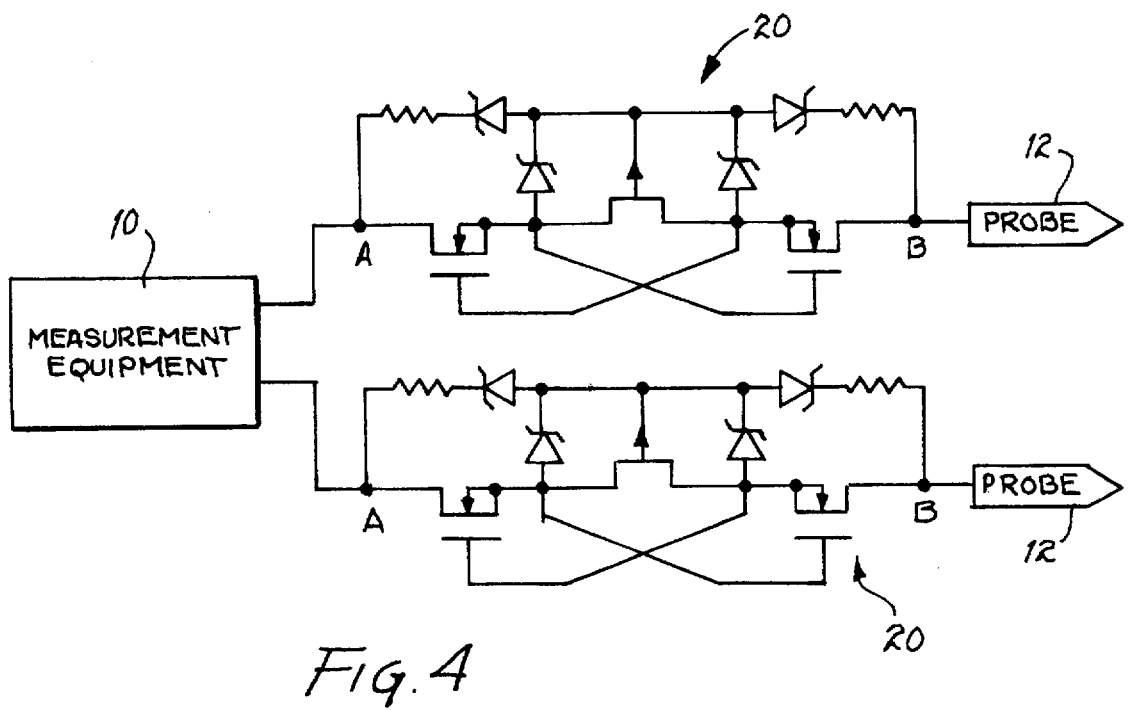
FIG. 4 is a simplified electrical schematic of the high voltage current limiting circuit of FIG. 3 implemented in series between the measurement equipment and the measurement probes.

Referring to FIG. 4, wherein like numerals and symbols represent like elements, the circuit 20 is shown implemented in instrumentation equipment. As can be seen, the circuit 20 is connected in series between the measurement equipment 10 and the probes 12. A separate circuit 20 is used for each probe 12.

OPERATION

The circuit 20 will have a resistive path across the two terminals A and B when the voltage across terminals A and B is below the zener diode voltage of D1 or D2. In the preferred embodiment of the present invention, the zener diodes D1 and D2 are 20.0 volt zener diodes.

The circuit 20 will pass signals of both negative and positive values as long as the absolute value of the signal is below the 20.0 volt value set by the zener diodes D1 and D2. As the current passing through the terminals A and B begins to increase, the voltage across the terminals A and B will also start to increase. The device J1 will be completely turned off when a voltage equal to or greater than the threshold voltage of the device J1 is applied to the gate of the device J1. Typically, the device J1 will have a threshold voltage of approximately 3.0 volts.

When the voltage across terminals A and B increases to 22.0 volts, the zener diode D1 will have a 20 volt drop and the remaining 2.0 volts will be on the gate of device J1. As the voltage across the terminals A and B increases to 23.0 volts, the zener diode D1 will have a 20 volt drop and the remaining 3.0 volts will be on the gate of device J1 thereby turning off the device J1. The 23.0 volts is considered to be the voltage trip point, $V_{trip}$ of the circuit 20. When 23.0 volts is measured across the terminals A and B, the resistive element 22 goes into a high resistance mode. When the device J1 is turned off, the device J1 effectively switches off the transistors M1 and M2. With the device J1 and the transistors M1 and M2 turned off, the only current path through the terminals A and B is the series path through R1, D1, D2, and R2. Thus, the only current passing through the circuit 20 is biasing current. The resistive element 22 will return back to a low resistive state when the voltage across the terminals A and B is reduced to a value less than 23.0 volts.

The terminals A and B of the circuit 20 are bi-directional and interchangeable. Negative voltages can be applied across the terminals A and B. If negative voltages are applied, the circuit 20 will have the same characteristics except that the voltages and currents will have negative values instead of positive values.

Figure 5:
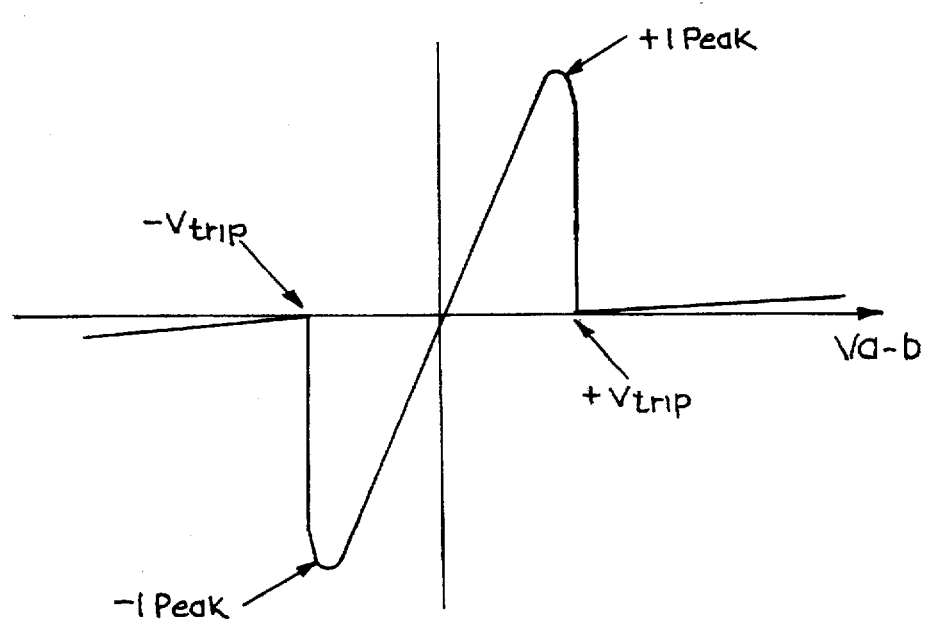
FIG. 5 is a graph showing the I-V characteristics of the high voltage current limiting circuit depicted in FIG. 3.

Referring to FIG. 5, an I-V graph of the performance of the circuit 20 is shown. The $I_{Peak}$ value is the current level just prior to the voltage across the terminals A and B exceeds 23.0 volts. The $I_{Peak}$ value can be determined by dividing the voltage trip point $V_{trip}$ by the on resistance of transistor M1 or by dividing the voltage trip point $V_{trip}$ by the on resistance of transistor M2 and device J1. The $I_{Peak}$ value can also be determined by finding the $Id_{ss}$ rating of transistors M1 and M2.

While the invention has been particularly shown and described with reference to preferred embodiments thereof, it will be understood by those skilled in the art that the foregoing and other changes in form and details may be made therein without departing from the spirit and scope of the invention.

I claim:

1. A high voltage current limiting protection circuit for measurement equipment comprising, in combination:

variable resistance means coupled between a first terminal and a second terminal of said high voltage current limiting protection circuit for generating low resistance to allow a fast response by said measurement equipment to measure current flowing between said first terminal and said second terminal and for generating a high resistance to limit current flow to a minimum level between said first terminal and said second terminal when a predetermined maximum voltage level across said first terminal and said second terminal is exceeded; and voltage trip point means coupled to said variable resistance means for setting said predetermined maximum voltage level to trigger said variable resistance means to generate said high resistance to limit current flow between said first terminal and said second terminal to said minimum level;

said voltage trip point means comprising:

a first zener diode having a first terminal coupled to said variable resistance means; and a second zener diode having a first terminal coupled to said variable resistance means and to said first terminal of said first zener diode.

2. A high voltage current limiting protection circuit in accordance with claim 1 wherein said variable resistance means comprises:

transistor means for generating negligible resistance between said first terminal and said second terminal when voltage across said first terminal and said second terminal is below said predetermined maximum voltage level and for generating a high resistance to limit current flow between said first terminal and said second terminal to said minimum level when said predetermined maximum voltage level across said first terminal and said second terminal is exceeded; and switch means coupled to said transistor means for generating negligible resistance between said first terminal and said second terminal when voltage across said first terminal and said second terminal is below said predetermined maximum voltage level and for switching said transistor means to a high resistance mode to generate a high resistance to limit current flow between said first terminal and said second terminal to said minimum level when said predetermined maximum voltage level across said first terminal and said second terminal is exceeded.

3. A high voltage current limiting protection circuit in accordance with claim 2 wherein said transistor means comprises:
   a first transistor having a gate coupled to said switch means; and
   a second transistor having a gate coupled to said switch means.

4. A high voltage current limiting protection circuit in accordance with claim 3 wherein said first transistor and said second transistor are depletion mode N-channel MOSFETs.

5. A high voltage current limiting protection circuit in accordance with claim 2 wherein said switch means is a transistor switch.

6. A high voltage current limiting protection circuit in accordance with claim 5 wherein said transistor switch is a depletion mode P-channel JFET.

7. A high voltage current limiting protection circuit in accordance with claim 5 wherein said transistor switch is a depletion mode P-channel MOSFET.

8. A high voltage current limiting protection circuit in accordance with claim 2 further comprising voltage protection means coupled to said switch means for protecting said switch means from damage due to voltage levels in excess of a voltage level rating of said switch means.

9. A high voltage current limiting protection circuit in accordance with claim 5 further comprising voltage protection means coupled to said transistor switch for protecting said transistor switch from damage due to voltage levels in excess of a voltage level rating of said transistor switch.

10. A high voltage current limiting protection circuit in accordance with claim 9 wherein said voltage protection means comprises:
   a first zener diode having a first terminal coupled to said variable resistance means and a second terminal coupled to a gate of said transistor switch; and
   a second zener diode having a first terminal coupled to said variable resistance means and a second terminal coupled to said gate of said transistor switch.

11. A high voltage current limiting protection circuit in accordance with claim 1 further comprising:
   first resistor means coupled to a second terminal of said first zener diode and to said variable resistance means for limiting a bias current to said first zener diode; and
   second resistor means coupled to a second terminal of said second zener diode and to said variable resistance means for limiting a bias current to said second zener diode.

12. A high voltage current limiting protection circuit for measurement equipment comprising, in combination:
   transistor means for generating negligible resistance between a first terminal and a second terminal of said high voltage current limiting protection circuit when voltage across said first terminal and said second terminal is below a predetermined maximum voltage level and for generating a high resistance to limit current flow between said first terminal and said second terminal to a minimum level when said predetermined maximum voltage level across said first terminal and said second terminal is exceeded, said transistor means comprising:
      a first depletion mode N-channel transistor; and
      a second depletion mode N-channel transistor having a gate coupled to said first depletion mode N-channel transistor;
   switch means coupled to said first and said second depletion mode N-channel transistor for generating negligible resistance between said first terminal and said second terminal when voltage across said first terminal and said second terminal is below said predetermined maximum voltage level and for switching said first and said second depletion mode N-channel transistor to a high resistance mode to generate a high resistance to limit current flow between said first terminal and said second terminal to said minimum level when said predetermined maximum voltage level across said first terminal and said second terminal is exceeded, said switch means comprising a depletion mode P-channel transistor switch;
   voltage protection means coupled to said depletion mode P-channel transistor switch for protecting said depletion mode P-channel transistor switch from damage due to voltage levels in excess of a voltage level rating of said depletion mode P-channel transistor switch, said voltage protection means comprising:
      a first zener diode having a first terminal coupled to said gate of said second depletion mode N-channel transistor and a second terminal coupled to said gate of said depletion mode P-channel transistor switch; and
      a second zener diode having a first terminal coupled to a gate of said first depletion mode N-channel transistor and a second terminal coupled to said gate of said depletion mode P-channel transistor switch;
   voltage trip point means coupled to said gate of said depletion mode P-channel transistor switch for setting said predetermined maximum voltage level to trigger said first and said second depletion mode N-channel transistor to generate said high resistance to limit current flow between said first terminal and said second terminal to said minimum level, said voltage trip point means comprising:
      a first zener diode having a first terminal coupled to said gate of said depletion mode P-channel transistor switch; and
      a second zener diode having a first terminal coupled to said gate of said depletion mode P-channel transistor switch and to said first terminal of said first zener diode;
   first resistor means coupled to a second terminal of said first zener diode of said voltage trip point means and to said first depletion mode N-channel transistor for limiting a bias current to said first zener diode of said voltage trip point means; and
   second resistor means coupled to a second terminal of said second zener diode of said voltage trip point means and to said second depletion mode N-channel transistor for limiting a bias current to said second zener diode of said voltage trip point means.

13. A high voltage current limiting protection circuit in accordance with claim 12 wherein said first and said second depletion mode N-channel transistors are depletion mode N-channel MOSFETs.

14. A high voltage current limiting protection circuit in accordance with claim 12 wherein said depletion mode P-channel transistor switch is a JFET.

15. A high voltage current limiting protection circuit in accordance with claim 12 wherein said depletion mode P-channel transistor switch is a MOSFET.

16. A method for providing a high voltage current limiting protection circuit for measurement equipment comprising the steps of:
   providing variable resistance means coupled between a first terminal and a second terminal of said high voltage current limiting protection circuit for generating low resistance to allow a fast response by said measurement equipment to measure current flowing between said first terminal and said second terminal and for generating a high resistance to limit current flow to a minimum level between said first terminal and said second terminal when a predetermined maximum voltage level across said first terminal and said second terminal is exceeded; and providing voltage trip point means coupled to said variable resistance means for setting said predetermined maximum voltage level to trigger said variable resistance means to generate said high resistance to limit current flow between said first terminal and said second terminal to said minimum level;

said step of providing voltage trip point means further comprising the steps of:

providing a first zener diode having a first terminal coupled to said variable resistance means; and providing a second zener diode having a first terminal coupled to said variable resistance means and to said first terminal of said first zener diode.

17. The method of claim 16 wherein said step of providing variable resistance means further comprises the steps of:

providing transistor means for generating negligible resistance between said first terminal and said second terminal when voltage across said first terminal and said second terminal is below said predetermined maximum voltage level and for generating a high resistance to limit current flow between said first terminal and said second terminal to said minimum level when said predetermined maximum voltage level across said first terminal and said second terminal is exceeded; and providing switch means coupled to said transistor means for generating negligible resistance between said first terminal and said second terminal when voltage across said first terminal and said second terminal is below said predetermined maximum voltage level and for switching said transistor means to a high resistance mode to generate a high resistance to limit current flow between said first terminal and said second terminal to said minimum level when said predetermined maximum voltage level across said first terminal and said second terminal is exceeded.

18. The method of claim 17 wherein said step of providing transistor means further comprises the steps of:

providing a first transistor having a gate coupled to said switch means; and providing a second transistor having a gate coupled to said switch means.

19. The method of claim 17 wherein said step of providing switch means further comprises the step of providing a transistor switch.

20. The method of claim 19 further comprising the step of providing voltage protection means coupled to said transistor switch for protecting said transistor switch from damage due to voltage levels in excess of a voltage level rating of said transistor switch.

21. The method of claim 20 wherein said step of providing voltage protection means further comprises the steps of:

providing a first zener diode having a first terminal coupled to said variable resistance means and a second terminal coupled to a gate of said transistor switch; and providing a second zener diode having a first terminal coupled to said variable resistance means and a second terminal coupled to said gate of said transistor switch.

22. The method of claim 16 further comprising the steps of:

providing first resistor means coupled to a second terminal of said first zener diode and to said variable resistance means for limiting a bias current to said first zener diode; and providing second resistor means coupled to a second terminal of said second zener diode and to said variable resistance means for limiting a bias current to said second zener diode.

* * * * *